United States Patent
Morita et al.

(10) Patent No.: US 6,354,896 B1
(45) Date of Patent: Mar. 12, 2002

(54) METHOD OF ASSEMBLING MOVABLE ELECTRODE TYPE ELECTRIC DUST COLLECTING APPARATUS

(75) Inventors: Kazunori Morita; Michio Hashimoto, both of Matsudo (JP)

(73) Assignee: Hitachi Plant Engineering & Construction Co., Ltd., Tokyo (JP)

(*) Notice: Subject to any disclaimer, the term of this patent is extended or adjusted under 35 U.S.C. 154(b) by 0 days.

(21) Appl. No.: 09/506,258

(22) Filed: Feb. 17, 2000

(51) Int. Cl.[7] .............................. H01S 4/00; B21D 53/00
(52) U.S. Cl. ......................................... 445/23; 29/592.1
(58) Field of Search ............................. 29/592.1; 445/23

(56) References Cited

U.S. PATENT DOCUMENTS

| | | | | |
|---|---|---|---|---|
| 3,633,262 A | * | 1/1972 | Huffel et al. ............... | 29/592.1 |
| 3,729,815 A | * | 5/1973 | Quintilian et al. .......... | 29/592.1 |
| 3,844,205 A | * | 10/1974 | Watanabe ..................... | 454/49 |
| 4,102,038 A | * | 7/1978 | Eagan ......................... | 29/592.1 |
| 4,375,364 A | * | 3/1983 | Van Hoessen et al. .......... | 96/87 |
| 4,440,552 A | * | 4/1984 | Uchiya et al. ................. | 96/40 |
| 4,523,931 A | * | 6/1985 | Miller et al. .................. | 95/286 |
| 5,547,496 A | * | 8/1996 | Hara .............................. | 96/79 |

* cited by examiner

Primary Examiner—Kenneth J. Ramsey
(74) Attorney, Agent, or Firm—Oliff & Berridge, PLC

(57) ABSTRACT

Before a hopper is mounted in a lower portion of a casing 12, a large number of discharge frames 14 are mounted through an open portion 39 of the hopper by a gate-shaped crane 41 arranged on the upper surface of the casing 12, followed by mounting a large number of movable electrodes 15 so as to be rotated around every other dischargeframe and finally mounting the hopper 13. The particular method permits carrying out efficiently the mounting operation of the discharge framesand the movable electrodes in assembling a movable electrode typed electric dust collecting apparatus.

8 Claims, 8 Drawing Sheets

(a)

(b)

METHOD OF ASSEMBLING MOVABLE ELECTRODE TYPE ELECTRIC DUST COLLECTING APPARATUS

TECHNICAL FIELD

The present invention relates to a method of assembling a movable electrode type electric dust collecting apparatus, particularly, to a method of assembling a movable electrode typed electric dust collecting apparatus comprising a large number of discharge frames that are allowed to hang a predetermined distance apart from each other within a casing, and a large number of movable electrodes each consisting of a pair of endless chains and a plurality of dust collecting grids that are attached to said pair of endless chains and arranged to form a loop as a whole, said movable electrodes being arranged to be rotated around every other discharge frame.

BACKGROUND ART

A movable electrode typed electric dust collecting apparatus of this kind is known as an electric dust collecting apparatus for removing particles of soot from the waste gas generated from, for example, boilers used in a thermoelectric power plant and from various furnaces in an iron mill. The construction of the movable electrode typed electric dust collecting apparatus, which is widely employed, is schematically shown in FIGS. 4 to 8.

As shown in FIG. 4, a movable electrode typed electric dust collecting apparatus 10 comprises a casing 12, a hopper 13 arranged in a lower portion of the casing 12, a large number of discharge frames 14 arranged within the casing 12, and a large number of movable electrodes 15. A waste gas 17 is introduced through an inlet of a fire flue 16 into the casing 12, and the dust is removed from the waste gas 17 within the casing 12 by the principle of the electric dust collection. Then, the clean waste gas is discharged from within the casing 12 to the outside through an outlet of a fire flue 18. The particles of soot removed from the waste gas 17 drop into the hopper 13 and are taken out of the hopper 13 by a mechanism (not shown) through a discharge port 19.

FIG. 5 is a cross sectional view as viewed in the direction denoted by arrows A in FIG. 4. As shown in the drawing, a large number of discharge frames 14 are allowed to hang a predetermined distance apart from each other within the casing 12. Also, a large number of movable electrodes 15 are arranged to be moved around every two discharge frames 14. FIG. 6 is a side view showing the mounting structure of the discharge frame 14 shown in FIG. 6. FIG. 7 is a cross sectional view as viewed in the direction denoted by arrows B in FIG. 6. The discharge frame 14 includes a large number of discharge wires 21 attached to a lattice-shaped frame body 20. An upper bracket 27 and a lower bracket 28 each extending from each of the discharge frames 14 are mounted an upper stage beam 25 and a lower stage beam 26 of a frame 24 hanging from an insulating tube 22 via a hanging rod 23 to permit the discharge frames 14 to be kept hung. Incidentally, reference numerals 29 and 30 denote a driving wheel and a lower roller, respectively, for driving the movable electrode 15.

FIG. 8 is an oblique view showing in detail the construction of the movable electrode 15. As shown in the drawing, a pair of endless chains 31, 31 are stretched between the driving wheel 29 in the upper portion and the lower roller 30. A plurality of dust collecting grids 32 are attached to these endless chains 31, 31 in the central portions 33 in the width direction of the dust collecting grids 32 to form a loop as a whole. A shaft 34 of the driving wheel 29 is rotated by a driving mechanism (not shown), and the rotation of the shaft 34 is transmitted through the paired endless chains 31, 31 by the driving wheel 29, result in a loopformed-dust collecting grids 32 allowing to be rotated around every other discharge frame 14.

In general, the height of the entire movable electrode typed electric dust collecting apparatus 10 reaches 20 to 30 meters, making it difficult to assemble the entire structure in a factory. Therefore, in assembling the dust collecting apparatus 10, it was customary in the past to build first the casing 12 in the site of installing the apparatus 10, followed by mounting the discharge frames 14 and the movable electrodes 15 within the casing 12.

However, each of discharge frames 14 is suspended by the hanging rods 23 in general 300 to 400 mm apart from each other. What should be noted is that it is necessary to attach to the endless chain 31 of the movable electrode 15 and the dust collecting grid 32 in the small space intermediate between adjacent discharge frames 14, 14 that are incorporated to fill the entire space within the casing 12. A small working space prevent shopman from mounting efficiently these discharge frame 14 and movable electrode 15.

Many steps are required for mounting the discharge frame 14 and the movable electrode 15 within the casing 12, giving rise to various problems. A long hard working conditions causes shopman and operator trouble in operation.

SUMMARY OF THE INVENTION

An object of the present invention is to provide a method of assembling a movable electrode type electric dust collecting apparatus, which permits performing efficiently the mounting operation of the discharge frames 14 and the movable electrodes 15 within the casing 12.

According to a first aspect of the present invention, there is provided a method of assembling a movable electrode type electric dust collecting apparatus including a large number of discharge frames that are allowed to hang a predetermined distance apart from each other within a casing and a large number of movable electrodes each consisting of a pair of endless chains and a plurality of dust collecting grids that are attached to said pair of endless chains and arranged to form a loop as a whole, said movable electrodes being arranged to be rotated around every two discharge frames, characterized in that the plural discharge frames are mounted first in predetermined positions within the casing, followed by mounting the plural movable electrodes.

The present invention is featured in that, for mounting the discharge frames and the movable electrodes, the discharge frames and the movable electrodes are introduced into predetermined positions within the casing through the open portion of the hopper before the hopper is mounted in a lower portion of the casing, followed by mounting the hopper.

The present invention is also featured in that a rail is arranged on the upper surface of the casing, and a gate-shaped movable crane capable of running along the rail is utilized for mounting the discharge frames and the movable electrodes in predetermined positions.

The present invention is also featured in that the process for mounting the movable electrode comprises the steps of forming first the movable electrode in a linear form, pulling up both end portions of the linear movable electrode simultaneously or separately through the open portion of the hopper to a ceiling position within the casing, and joining the both end portions of the linear movable electrode to each other in the ceiling position to form a loop of the movable electrode.

The present invention is further featured in that the process of forming the movable electrode comprises the steps of forming first the movable electrode in the form of two parts substantially equal to each other in length, bringing these parts of the movable electrode to predetermined positions in a lower portion of the casing, pulling up the upper end portion of each of the two parts of the movable electrode through the open portion of the hopper to a ceiling position within the casing, joining the upper end portions of the two parts of the movable electrode to each other in the ceiling position, and joining the lower end portions of the two parts of the movable electrode to each other in a lower position within the casing to form a loop of the movable electrode.

According to the present invention, in assembling a movable electrode typed electric dust collecting apparatus including a large number of discharge frames that are allowed to hang a predetermined distance apart from each other within a casing and a large number of movable electrodes each consisting of a pair of endless chains and a plurality of dust collecting grids that are attached to said pair of endless chains and arranged to form a loop as a whole, said movable electrodes being arranged to be rotated around every two discharge frames, the mounting operation of these discharge frames and movable electrodes can be performed efficiently within the casing.

LIST OF REFERENCE NUMERALS

12 . . . casing; 13 . . . hopper; 14 . . . discharge frame; 15 . . . movable electrode; 29 . . . driving wheel; 31 . . . endless chain; 32 . . . dust collecting grid; 39 . . . hopper opening portion; 40 . . . rail; 41 . . . gate-shaped movable crane; 44 . . . wire

DETAILED DESCRIPTION OF THE PREFERRED EMBODIMENT

Figure 1:
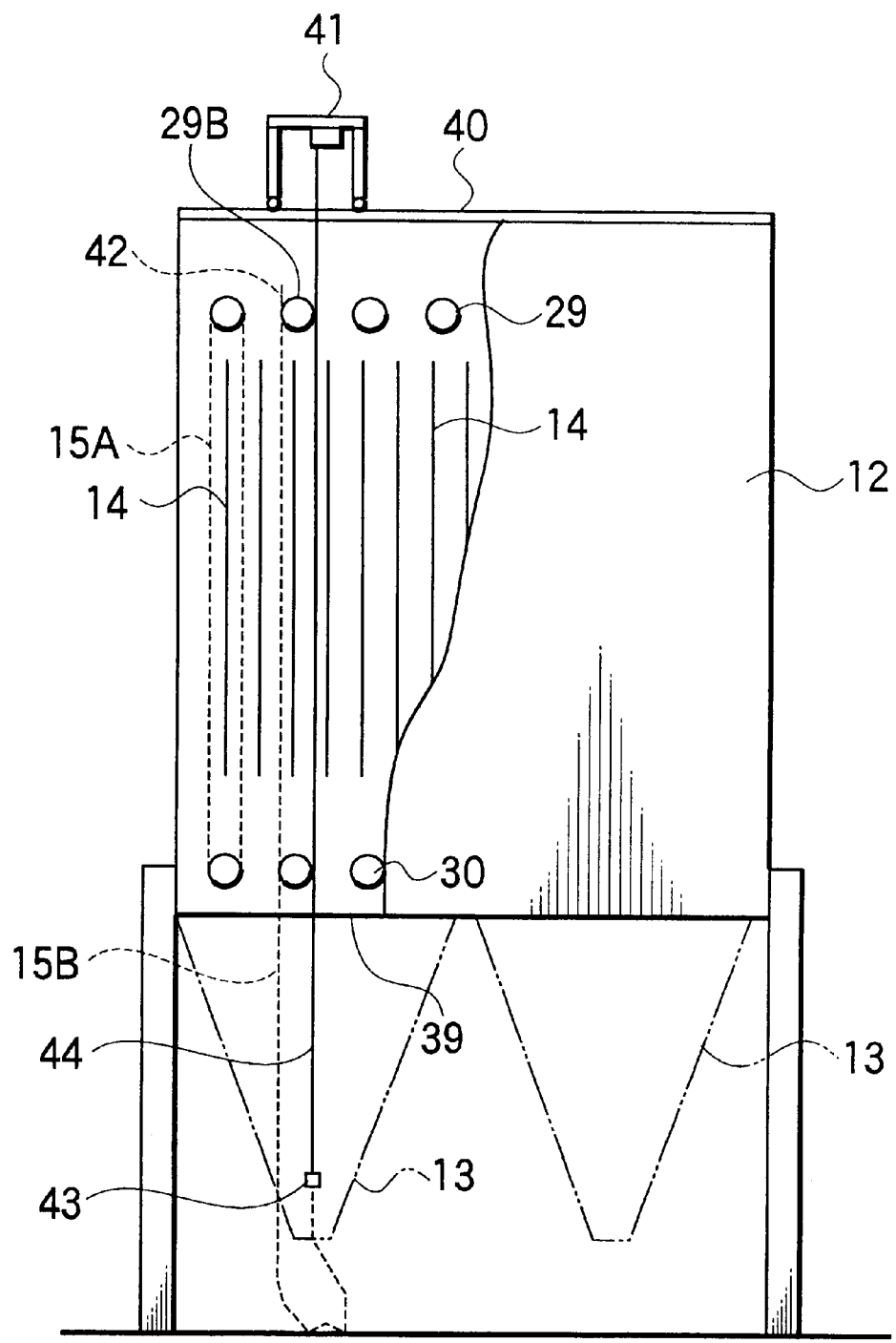
FIG. 1 is a cross sectional view, partly broken away, showing a movable electrode typed electric dust collecting apparatus according to one embodiment of the present invention.

FIG. 1 shows a movable electrode type electric dust collecting apparatus according to one embodiment of the present invention. In this embodiment, the movable electrode type electric dust collecting apparatus is assembled as follows.

In the first step, the casing 12 is constructed. In this stage, the lower hopper 13 is not mounted to the casing 12 to leave open the lower portion of the casing 12.

Figure 6:
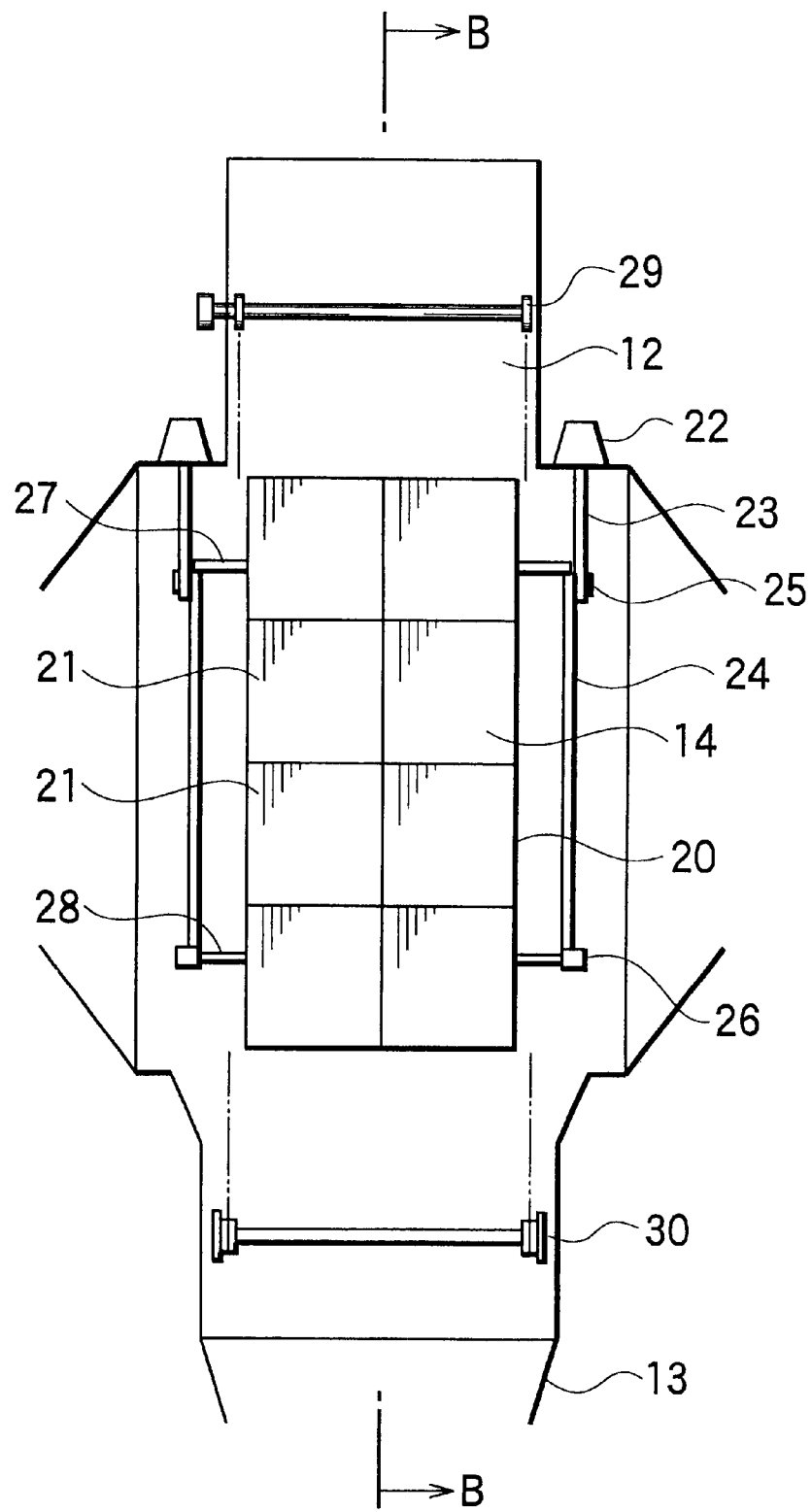
FIG. 6 is a side view showing the mounting structure of the discharge frame.
Figure 7:
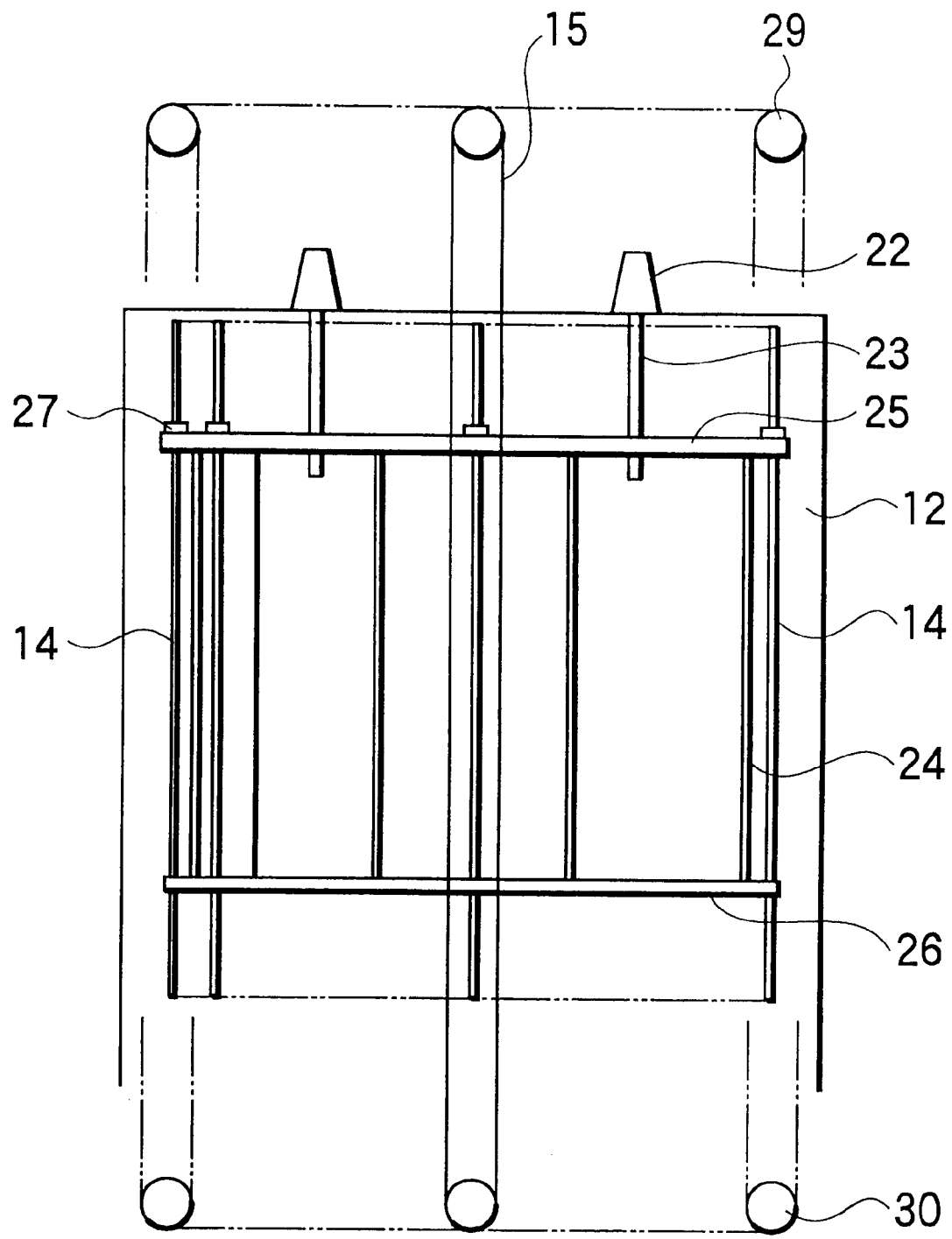
FIG. 7 is a cross sectional view as viewed in the direction denoted by arrows B in FIG. 6.
Figure 8:
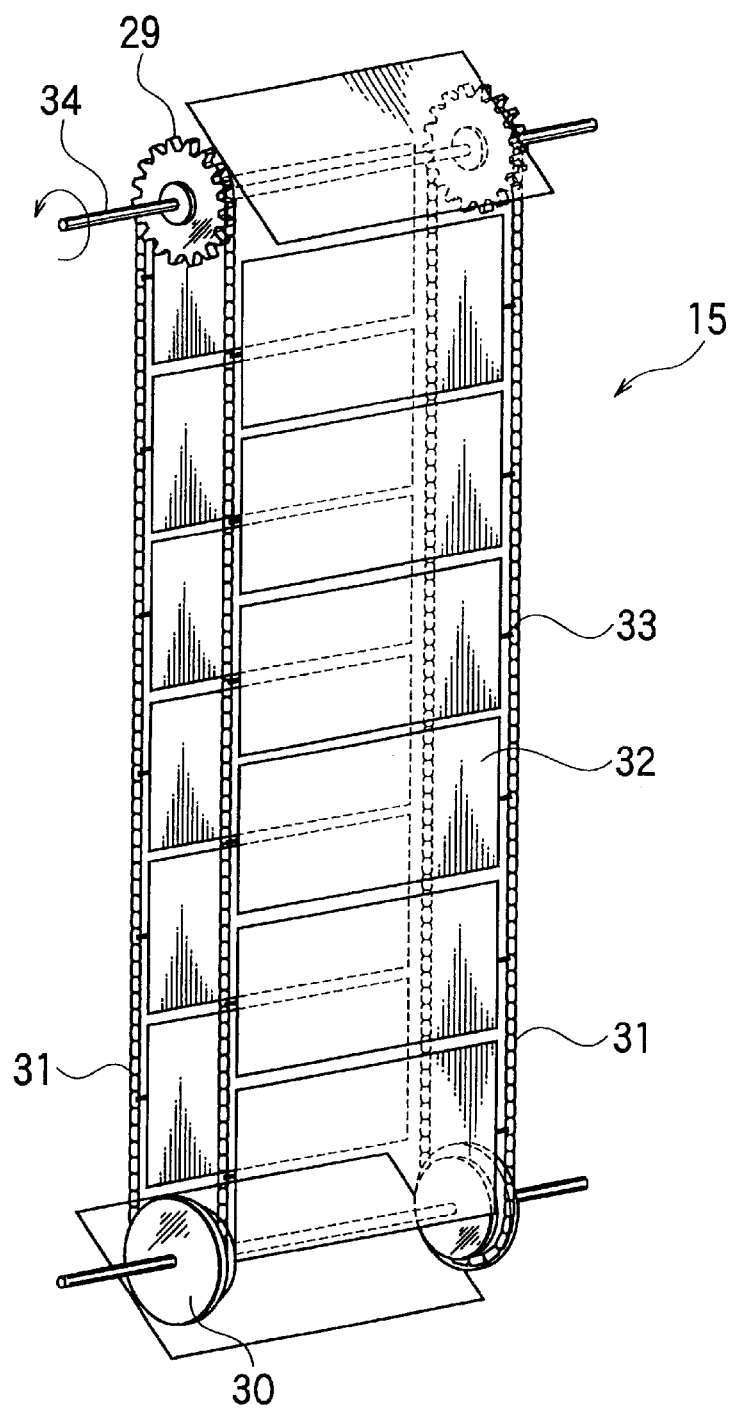
FIG. 8 is an oblique view showing in detail the construction of the movable electrode.

In the next step, the insulating tube 22 is mounted to an upper portion of the casing 12 and the hanging rod 23 is allowed to drop from the insulating tube 22, as shown in FIGS. 6 and 7. Then, the lower end of the hanging rod 23 is joined to the upper stage beam 25 of the frame 24 so as to permit the entire frame 24 to hang down.

Further, the discharge frame 14 prepared in another site is transferred to a desired position of a hopper opening portion 39 below the casing 12. Then, the discharge frame 14 is moved upward within the casing 12 by using a lifting machine such a crane or a hoist arranged above the casing 12, followed by joining an upper bracket 27 and a lower bracket 28 mounted to the discharge frame 14 to the upper stage beam 25 and the lower stage beam 26, respectively, of the frame 24 so as to finish mounting a single discharge frame 14.

Likewise, all of the plural discharge frames 14 are allowed to hang on the frame 24.

In mounting the discharge frame 14, transfer of the discharge frame 14 into the casing 12 and the operation of the lifting machine can be performed freely in the absence of obstacle in each of the upper and lower portions of the casing 12, leading to efficientlycarry out their works.

In the next step, the driving wheel 29 and the lower roller 30 of the movable electrode 15 are mounted in predetermined positions within the casing 12. It should be noted that, that mounting the driving wheel 29 and the lower roller 30 to the casing 12 prior to the discharge frame 14 makes the discharge frame 14 difficult to mount to the casing 12 in the presence of the driving wheel 29 and the lower roller 30.

Next, mounting the movable electrode 15 is explained. In the first step, two adjacent rings of each of the paired endless chains 31, 31 are separated from each other at one point to form a pair of linear chains. The plural dust collecting grids 32 are respectively attached to the linear chains to prepare the movable electrode 15 in which the loop of the dust collecting grids 32 is separated at one point. The movable electrode 15 thus prepared is transferred into a desired position within the hopper opening portion 39 below the casing 12.

In the next step, the movable electrode 15 is allowed to hang within the casing 12 by a gate-shaped movable crane 41 capable of running along a rail 40 arranged in an upper portion of the casing 12, as shown in FIG. 1. FIG. 1 shows the state of hanging a second movable electrode 15B after completion of hanging of a first movable electrode 15A. It is shown that one end portion 42 of the movable electrode 15B, whose loop has been cut away, has already been pulled up by the gate-shaped movable crane 41 to a position of a driving wheel 29B in an upper portion of the casing 12. The one end portion 42 of the movable electrode 15B is provisionally held stationary there by a suitable method.

Figure 2:
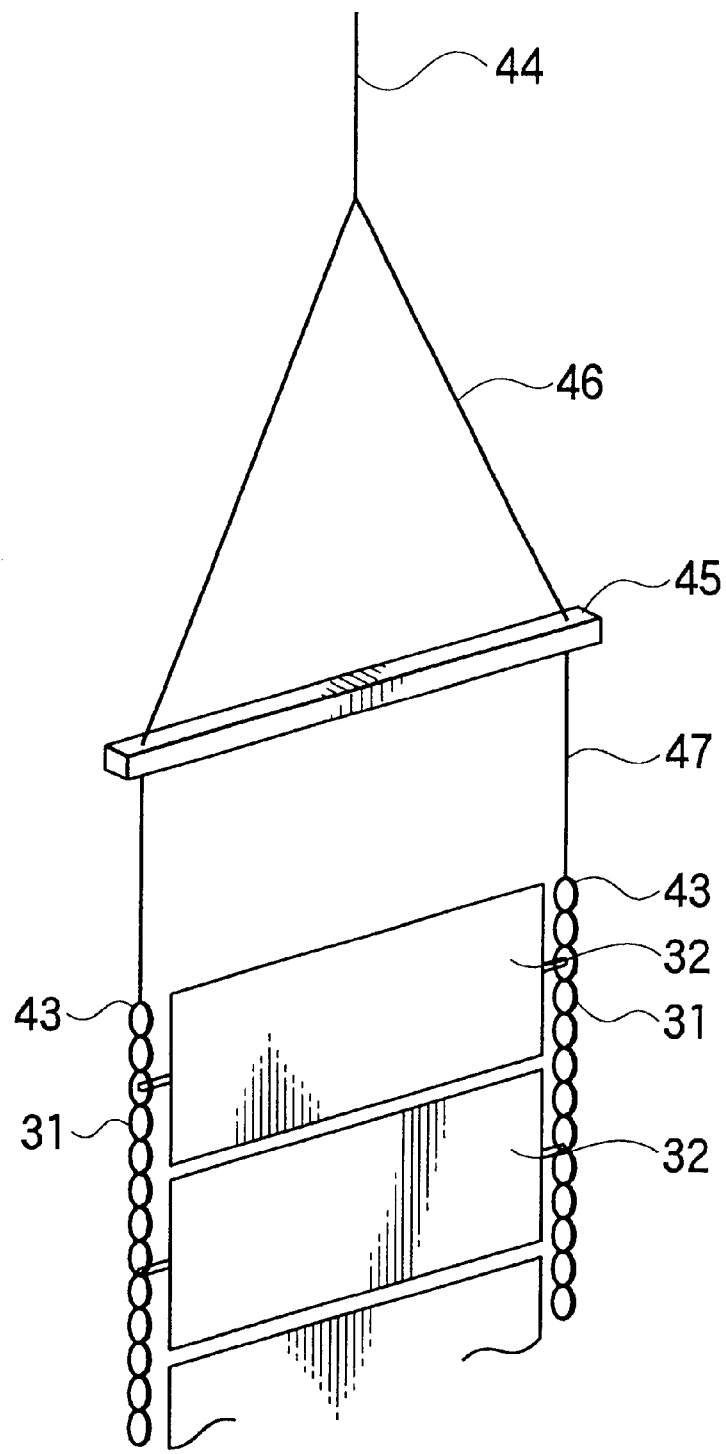
FIG. 2 is an oblique view showing how the edge portion of the movable electrode is hung in the movable electrode type electric dust collecting apparatus of the present invention.

Then, the other end portion 43 of the movable electrode 15B, whose loop has been cut away, is lifted up by the gate-shaped crane 41 from the state of being bound with a wire 44 as shown in FIG. 1 to the position of a driving wheel 29B in an upper portion of the casing 12. Incidentally, in allowing the other end 43 to be engaged with the wire 44, it is desirable to allow the end portions of the chains 31, 31 to hang from auxiliary wires 46, 47 by using a hanging balance 45 having a length equal to the mounting distance between the two chains 31, 31, as shown in FIG. 2.

After the other end 43 has been pulled up, the other end 43 is joined by a suitable means to said one end 42 that has been pulled up and provisionally held stationary in advance, thereby forming the endless chains 31, 31. The endless chains 31, 31 thus formed are stretched between the driving wheel 29 and the lower roller 30 to finish mounting the movable electrode 15B. By the similar procedure, all of the plural movable electrodes 15 are mounted successively to the driving wheel 29 and the lower roller 30. After all the movable electrodes 15 have been mounted, the hopper 13 is mounted to the lower portion of the casing 12 so as to finish assembling the main constituting members of the movable electrode type electric dust collecting apparatus.

As described above, according to the embodiment shown in the drawings, a large number of discharge frames are mounted first at predetermined positions within the casing, followed by mounting the movable electrodes to be moved around every two discharge frames. The particular method of the present invention permits mounting the discharge frames and the movable electrodes smoothly and efficiently.

It should also be noted that the discharge frames and the movable electrodes are moved into predetermined positions within the casing through the open portion of the hopper before the hopper is mounted to the lower portion of the casing, followed by mounting the hopper. Therefore, the discharge frames and the movable electrodes can be moved upward efficiently to predetermined positions within the casing without using a lifting machine such as a crane. The upward movement can be achieved efficiently, compared with the case where the discharge frames and the movable electrodes are allowed to hang down through the opening in the ceiling of the casing.

It should also be noted that a rail is arranged on the upper surface of the casing, and the discharge frames and the movable electrodes are transferred into the casing by a gate-shaped movable crane capable of running along the rail. Naturally, the positions at which the discharge frames and the movable electrodes are mounted can be determined easily. Particularly, the method of the present invention is adapted for use in the case where the movable electrodes are pulled up through small clearances between the adjacent discharge frames.

It should also be noted that the movable electrode is prepared first in a linear form and brought to a predetermined position below the casing. Then, the both end portions of the linear movable electrodes are pulled up through the open portion of the hopper to a ceiling position within the casing. Then, the both end portions of the linear movable electrode are joined to each other in the ceiling position to prepare the endless movable electrode. Because of the particular method, the endless movable electrode can be assembled and mounted promptly.

Figure 3:
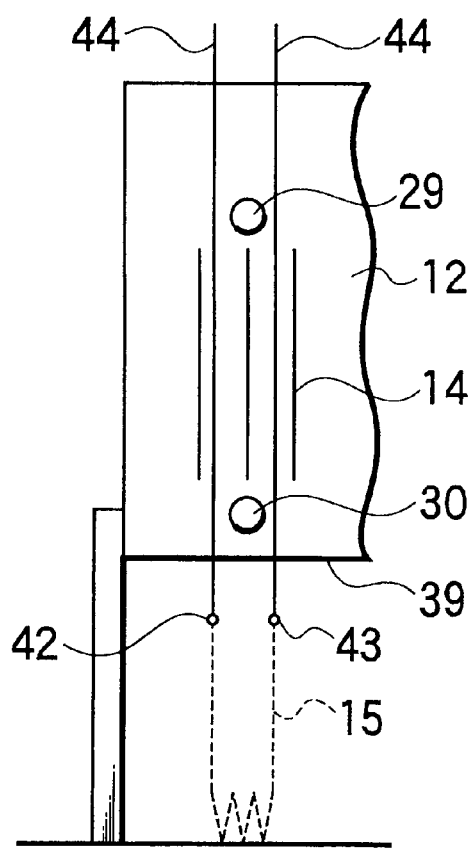
FIGS. 3(a) and 3(b) are cross sectional views partly showing other embodiments of the present invention.
Figure 3:
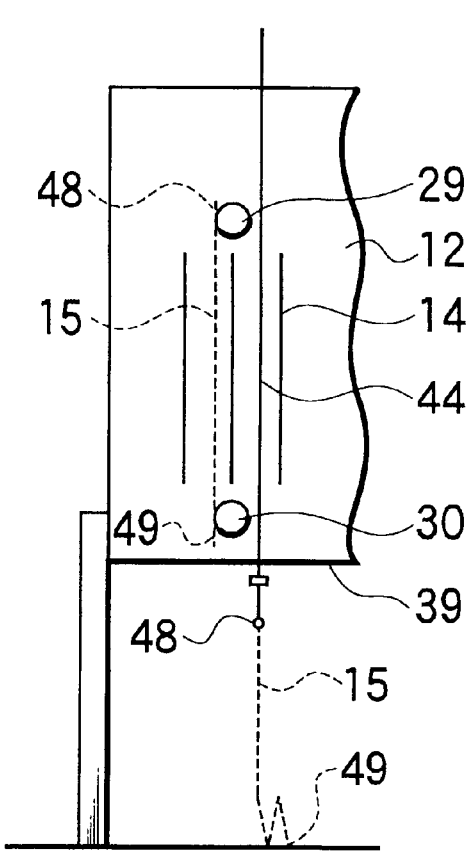
Figure 4:
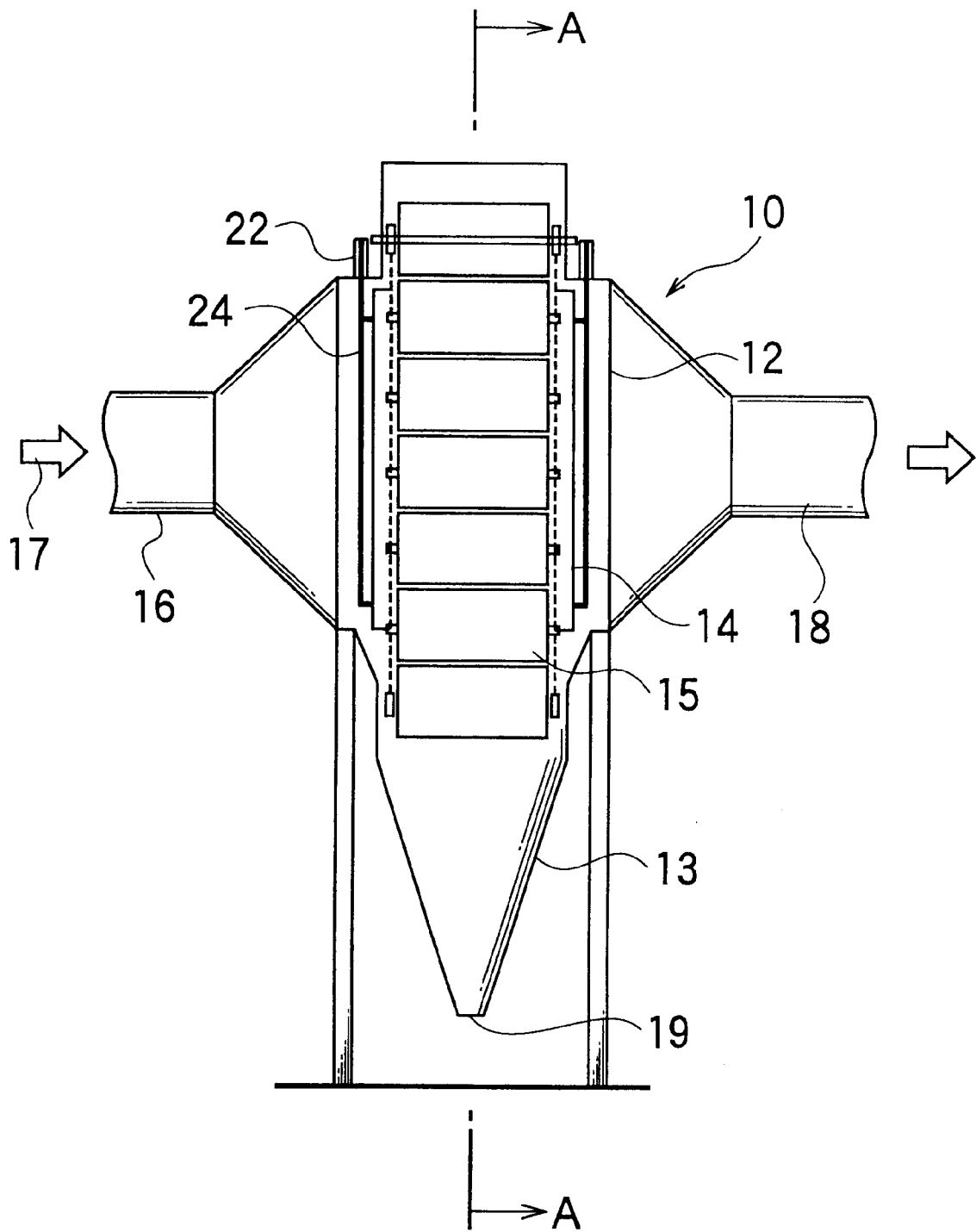
FIG. 4 is a cross sectional view showing the general construction of a movable electrode type electric dust collecting apparatus.
Figure 5:
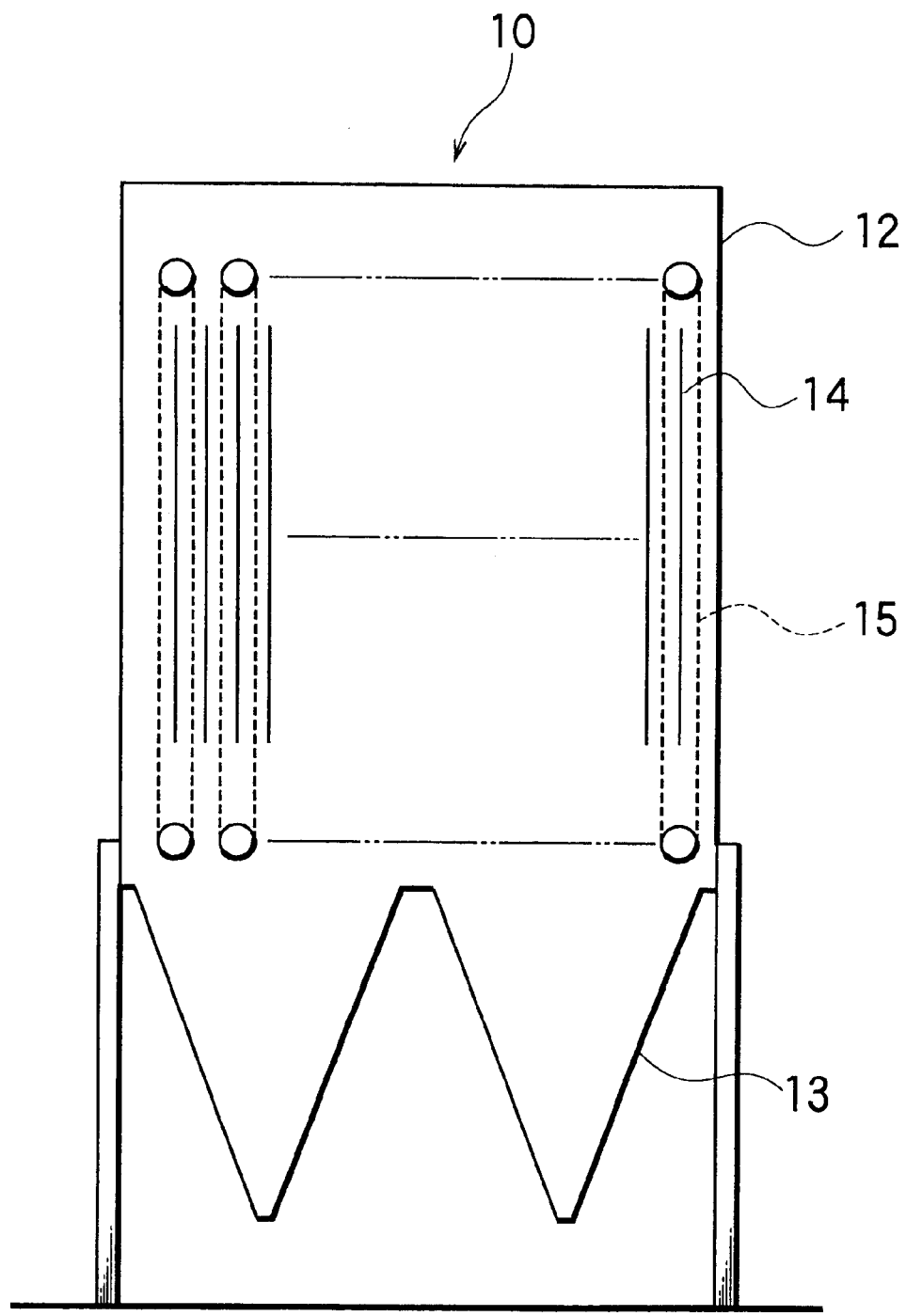
FIG. 5 is a cross sectional view as viewed in the direction denoted by arrows A in FIG. 4.

FIGS. 3(a) and 3(b) show other embodiments of the present invention. The embodiment shown in FIG. 3(a) is equal to the embodiment described above in the steps of preparing the movable electrode 15 in a linear form and bringing the linear electrode to a predetermined position below the casing 1. In the embodiment shown in FIG. 3(a), however, one end 42 and the other end 43 of the linear movable electrode are simultaneously pulled up through the open portion 39 of the hopper by a pair of wires 44, 44 to a 5 ceiling position within the casing 12. Therefore, the pull-up efficiency of the movable electrode 15 is further improved.

In the embodiment shown in FIG. 3(b), the movable electrode 15 is prepared first in the form of two parts substantially equal to each other in length. Then, these two parts are brought to predetermined positions in a lower portion of the casing 12, followed by pulling up one end portion of each of these two parts of the movable electrode 15 through the open portion 39 of the hopper to a ceiling position within the casing 12. Further, the upper end portions 48, 48 of these two parts of the movable electrode 15 are joined to each other in the ceiling position. Also, the lower end portions of the two parts of the movable electrode 15 are joined to each other in a lower portion within the casing 12 to prepare the movable electrode 15 in the form of a loop. In this embodiment, the movable electrode 15 is prepared first in the form of two parts substantially equal to each other in length. Since these two parts are transferred and pulled up separately, the lifting capacity of, for example, the gate-shaped movable crane 41 can be reduced to a half, making it possible to minimize the assembling apparatus and to simplify the assembling operation.

In each of the embodiments described above, the gate-shaped movable crane is arranged on the upper surface of the casing 12 for transferring the discharge frames and the movable electrodes to desired positions within the casing. Alternatively, another lifting machine such as a jib crane arranged on the ground or on the upper surface of the housing 12 can be used in place of the gate-shaped movable crane 41.

What is claimed is:

1. A method of assembling a movable electrode type electric dust collecting apparatus including a large number of discharge frames that are allowed to hang a predetermined distance apart from each other within a casing and a large number of movable electrodes each consisting of a pair of endless chains and a plurality of dust collecting grids that are attached to said pair of endless chains and arranged to form a loop as a whole, said movable electrodes being arranged to be rotated around every other discharge frame, characterized in that said plural discharge frames are mounted first in predetermined positions within said casing, followed by mounting said plural movable electrodes.

2. The method of assembling a movable electrode type dust collecting apparatus according to claim 1, characterized in that, for mounting the discharge frames and the movable electrodes, the discharge frames and the movable electrodes are introduced into predetermined positions within the casing through the open portion in a lower portion of the casing, followed by mounting the hopper in a lower portion of the casing.

3. The method of assembling a movable electrode type dust collecting apparatus according to claim 2, characterized in that a rail is arranged on the upper surface of the casing, and a gate-shaped movable crane capable of running along the rail is utilized for mounting the discharge frames and the movable electrodes in predetermined positions.

4. The method of assembling a movable electrode typed dust collecting apparatus according to claim 2, characterized in that the process for mounting the movable electrode comprises the steps of:

forming first the movable electrode in a linear form;

bringing said movable electrode to a predetermined position in a lower portion of the casing;

pulling up both end portions of the linear movable electrode simultaneously or separately through the open portion of the hopper to a ceiling position within the casing; and joining the both end portions of the movable electrode to each other in the ceiling position to form a loop of the movable electrode.

5. The method of assembling a movable electrode type dust collecting apparatus according to claim 2, characterized in that the process of forming the movable electrode comprises the steps of:

forming first the movable electrode in the form of two parts substantially equal to each other in length;

bringing these parts of the movable electrode to predetermined positions in a lower portion of the casing;

pulling up the upper end portion of each of the two parts of the movable electrode through the open portion of the hopper to a ceiling position within the casing;

joining the upper end portions of the two parts of the movable electrode to each other in the ceiling position; and joining the lower end portions of the two parts of the movable electrode to each other in a lower position within the casing to form a loop of the movable electrode.

6. A method of assembling a movable electrode typed electric dust collecting apparatus including a casing, a discharge frame arranged within said casing, and a looped movable electrode having said discharge frame housed therein, characterized in that the process for preparing said looped movable electrode comprises the steps of:

mounting in advance said discharge frame within said casing;

bringing a movable electrode formed in a linear form to a position in a lower portion of the housing; and joining a wire hanging from an upper portion of the casing to an edge portion of the linear movable electrode to pull up the linear movable electrode such that the linear movable electrode is moved to surround the discharge frame, followed by joining the both end portions of the linear movable electrode to each other to form a loop of the movable electrode having the discharge frame housed therein.

7. A method of assembling a movable electrode type electric dust collecting apparatus including a casing, a discharge frame arranged within said casing, and a looped movable electrode having said discharge frame housed therein, characterized in that the process for preparing said looped movable electrode comprises the steps of:

mounting in advance said discharge frame within said casing;

bringing a movable electrode formed in a linear form to a position in a lower portion of the housing;

joining a pulling wire hanging from an upper portion of the casing to an edge portion of the linear movable electrode to pull up one end portion of the linear movable electrode, followed by provisionally fixing said one end portion of the linear movable electrode to an upper portion of the casing;

joining said pulling wire to the other edge portion of the linear movable electrode to pull up the other edge portion of the movable electrode; and joining the both end portions of the linear movable electrode to each other to form a loop of the movable electrode having the discharge frame housed therein.

8. A method of assembling a movable electrode type electric dust collecting apparatus including a casing, a discharge frame arranged within said casing, and a looped movable electrode having said discharge frame housed therein, characterized in that the process for preparing said looped movable electrode comprises the steps of:

mounting in advance said discharge frame within said casing;

bringing a movable electrode that is divided into two parts to a position in a lower portion of the housing;

joining a pulling wire hanging from an upper portion of the casing to an edge portion of one of the divided two parts of the movable electrode to pull up one of the divided two parts of the movable electrode and provisionally fixing said edge portion to an upper portion of the casing;

joining said pulling wire to an edge portion of the other divided part of the movable electrode to pull up said other divided part of the movable electrode; and joining the ends of the divided two parts of the movable electrode to each other in each of an upper position and a lower position within the casing to form a loop of the movable electrode having the discharge frame arranged therein.

* * * * *